US007080851B2

(12) United States Patent
Schipper

(10) Patent No.: US 7,080,851 B2
(45) Date of Patent: Jul. 25, 2006

(54) GUIDE CART

(75) Inventor: Ulf Schipper, Ulm (DE)

(73) Assignee: Andreas Stihl AG & Co. KG (DE)

(*) Notice: Subject to any disclaimer, the term of this patent is extended or adjusted under 35 U.S.C. 154(b) by 0 days.

(21) Appl. No.: 10/799,134

(22) Filed: Mar. 12, 2004

(65) Prior Publication Data

US 2004/0183274 A1 Sep. 23, 2004

(30) Foreign Application Priority Data

Mar. 18, 2003 (DE) ................................ 203 04 278

(51) Int. Cl.
*B62M 1/08* (2006.01)

(52) U.S. Cl. ...................... 280/651; 280/47.2; 451/344

(58) Field of Classification Search ................ 280/651, 280/642, 641, 654, 47.2, 47.16, 43.15, 43.16, 280/62; 248/168, 173, 432, 439; 125/13.01, 125/13.03, 14
See application file for complete search history.

(56) References Cited

U.S. PATENT DOCUMENTS

| | | | | |
|---|---|---|---|---|
| 606,451 | A * | 6/1898 | English | 280/642 |
| 640,631 | A * | 1/1900 | Conti | 280/641 |
| 1,358,235 | A * | 11/1920 | Nylin | 280/47.34 |
| 1,501,242 | A * | 7/1924 | Sabin | 280/47.2 |
| 1,564,713 | A * | 12/1925 | Reiter | 280/43.16 |
| 1,606,796 | A * | 11/1926 | Jones | 280/43.16 |
| 2,397,317 | A * | 3/1946 | Hulburt et al. | 280/641 |
| 2,598,168 | A * | 5/1952 | Hooz et al. | 280/641 |
| 2,606,770 | A * | 8/1952 | Reichert | 280/641 |
| 3,064,990 | A * | 11/1962 | Salvucci | 280/47.2 |
| 4,155,527 | A * | 5/1979 | Sjoberg | 280/47.2 |
| 4,538,696 | A * | 9/1985 | Carter | 280/641 |
| 4,570,732 | A * | 2/1986 | Craven | 280/DIG. 5 |
| 4,681,330 | A * | 7/1987 | Misawa | 280/47.2 |
| 4,840,431 | A | 6/1989 | Jedick | |
| 4,953,523 | A * | 9/1990 | Swan | 125/14 |
| 5,429,420 | A | 7/1995 | Johnson | |
| 5,445,399 | A * | 8/1995 | Salvucci, Sr. | 280/47.27 |
| 5,452,943 | A | 9/1995 | Campbell | |
| 5,875,652 | A * | 3/1999 | Davis | 280/651 |
| 6,000,712 | A * | 12/1999 | Wu | 280/639 |
| 6,120,053 | A * | 9/2000 | DeAngelis | 280/641 |
| 6,478,666 | B1 * | 11/2002 | Berger et al. | 125/13.01 |
| 6,595,840 | B1 * | 7/2003 | Jaensch et al. | 125/13.01 |
| 6,637,423 | B1 * | 10/2003 | Rettenweber et al. | 125/13.01 |

FOREIGN PATENT DOCUMENTS

| | | |
|---|---|---|
| EP | 1 075350 | 1/2002 |
| WO | WO 90/12624 | * 11/1990 |
| WO | WO 99/56909 | 5/1999 |

* cited by examiner

*Primary Examiner*—Hau Phan
(74) *Attorney, Agent, or Firm*—Robert W Becker & Associates; Robert W. Becker

(57) ABSTRACT

A guide cart for an implement including a frame on which is disposed at least two wheels, and a first strut on which is disposed at least one wheel, and a second strut, wherein for a mounting of said second strut on said frame at least two spaced-apart mounting points are provided.

13 Claims, 2 Drawing Sheets

GUIDE CART

BACKGROUND OF THE INVENTION

The invention relates to a guide cart for a tool such as a parting-off grinder or similar device.

A guide cart for a parting-off grinder is known from EP 1 075 350 B1. The guide cart has a device for adjusting the height of the front wheel. For this purpose the front wheel is mounted on the frame of the guide cart by a strut in such a manner that it is able to rotate. The strut can be fixed to the frame of the guide cart in several positions by locking pieces. In this arrangement the adjusting device is positioned in the area of the parting-off wheel of the parting-off grinder. This makes adjustment of the cutting height of the parting-off grinder awkward for the operator as the operator is obliged to walk around the guide cart in order to set the cutting height and to support the full weight of the guide cart when making an adjustment.

The object of the invention is to provide a guide cart of the aforementioned general type in which the cutting height of a tool positioned on the guide cart can be adjusted simply and in an operator-friendly manner.

SUMMARY OF THE INVENTION

This object is achieved by means of a guide cart having a frame on which are disposed at least three wheels, and a first strut and a second strut for effecting mounting of at least one of the wheels on the frame, wherein the first strut is rotatably mounted on the frame, and wherein for a mounting of the second strut at least two spaced-apart mounting points are provided.

The fact that the wheel is fixed in position by two struts means that it can be adjusted simply by mounting the strut at another mounting point. In this arrangement the struts permit adjustment to be carried out from an area located behind the rear wheels of the guide cart, thereby providing an operator-friendly adjustment mechanism. The struts permit simple operation which requires little force.

The two mounting points are advantageously positioned on the second strut. The point at which the strut with the mounting points can be fixed to the frame therefore remains set and adjustment can therefore always be carried out from the same operating location. In order that the cutting depth may be adjusted simply and easily the second strut is designed as a locking strip with a plurality of mounting points. Ease of operation is achieved when the mounting points on the second strut are designed as notches, the notches being open in particular towards a longitudinal side of the second strut. In order to guarantee a secure fix in the locked position, the notches co-operate with a locking element which is spring-loaded in the direction of the locked position. In order to make an adjustment the second strut must therefore simply be moved in the direction of the notches so that the notch is released by a locking element and the second strut can be moved in the direction of travel to another notch with which the second strut can then be locked to the locking element.

An adjustment mechanism which is simple to operate can be achieved by mounting the second strut on a bolt which projects into a longitudinal notch in the second strut. In this arrangement, the locking element is mounted on the frame in such a manner that it can be rotated about the bolt. By rotating the locking element about the bolt against the force of the spring it is possible to release the second strut and adjust it longitudinally. When the locking element is released it locks in a notch and thereby fixes the second strut longitudinally. The locking element is advantageously positioned on a guide which overlaps the second strut and is mounted on the bolt. By rotating the guide about the bolt it is therefore possible to release or lock the locking element. In this arrangement, the rotational movement of the locking element about the bolt is expediently limited in the direction of the locked position by means of a stop.

The frame advantageously has a guide rod. At the end of said guide rod facing the edges is positioned a frame section which runs approximately at right angles to the guide rod and to which the two struts are fixed. The second strut is advantageously mounted on the first strut in such a manner that it is able to rotate. This means that the fulcrum of the second strut can be offset in order to produce shorter lever arms. The first strut expediently takes the form of a plate, the wheel being mounted in a first corner of the plate, a second corner of the plate being mounted on the frame in such a manner that it is able to rotate and the locking strip being mounted in such a manner that it is able to rotate in a third corner of the plate. The guide cart has in particular a front wheel and two rear wheels, the front wheel being supported by the two struts. In this arrangement the second strut extends in particular from the front wheel in the direction of the rear wheels and it is therefore possible to operate the second strut to adjust the cutting depth of the tool from the area of the two rear wheels.

BRIEF DESCRIPTION OF THE DRAWINGS

An embodiment of the invention is described below with reference to the drawings, in which.

DESCRIPTION OF SPECIFIC EMBODIMENTS

Figure 1:
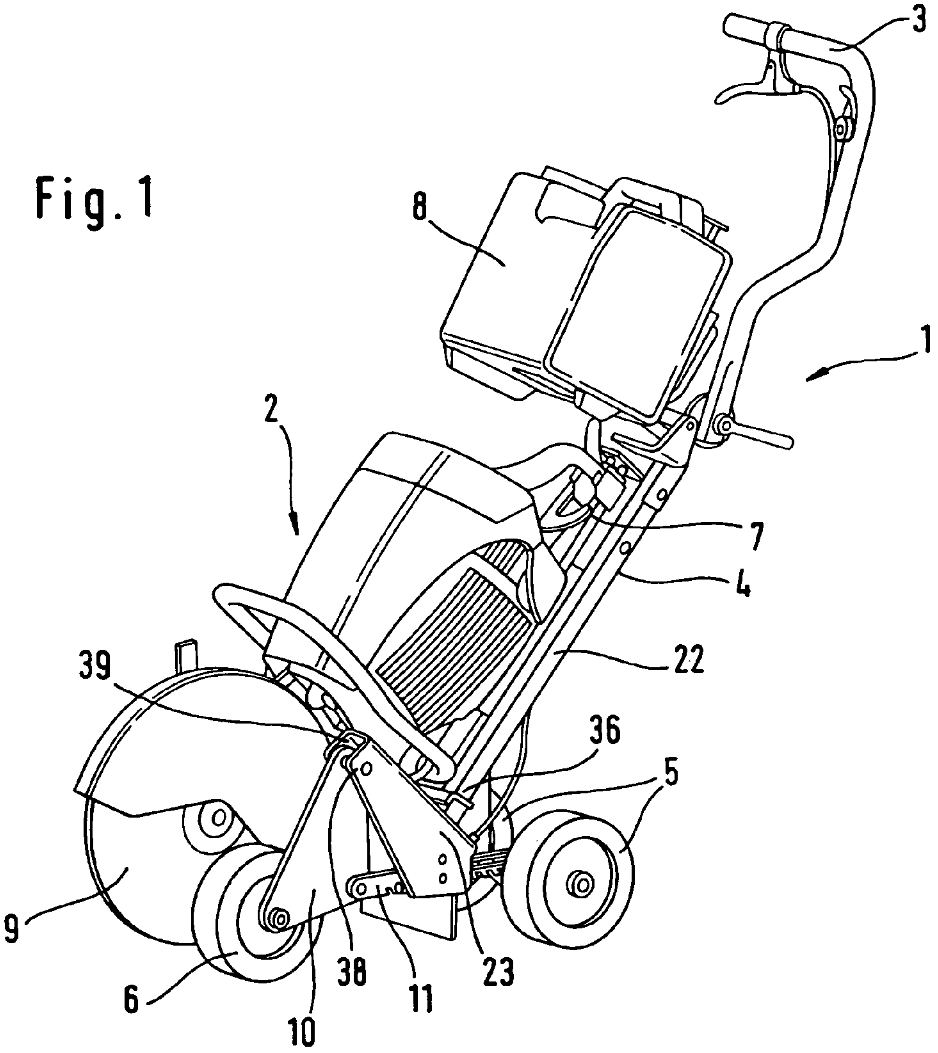
FIG. 1 shows a perspective view of a guide cart with a parting-off grinder.

FIG. 1 shows a guide cart 1 on which is positioned a parting-off grinder 2. The guide cart 1 has a frame 4 on which is positioned a handle 3 for operating the guide cart 1. Fixed to the frame 4 of the guide cart 1 by means of a mounting mechanism 7 is the parting-off grinder 2. The guide cart 1 has two rear wheels 5 and one front wheel 6, the parting-off wheel 9 of the parting-off grinder 2 being positioned in the area of the front wheel 6. To avoid the development of dust a water tank 8 is fixed to the guide cart 1 from which water is sprayed on to developing dust during grinding, thereby consolidating or binding it.

The frame 4 has a guide rod 22 on the end 36 of which facing the wheels 5,6 is fixed a frame section 23. The frame section 23 extends approximately perpendicular to the longitudinal direction of the guide rod 22. The front wheel 6 is mounted on the frame section 23 by a first strut 10 and a second strut 11.

Figure 2:
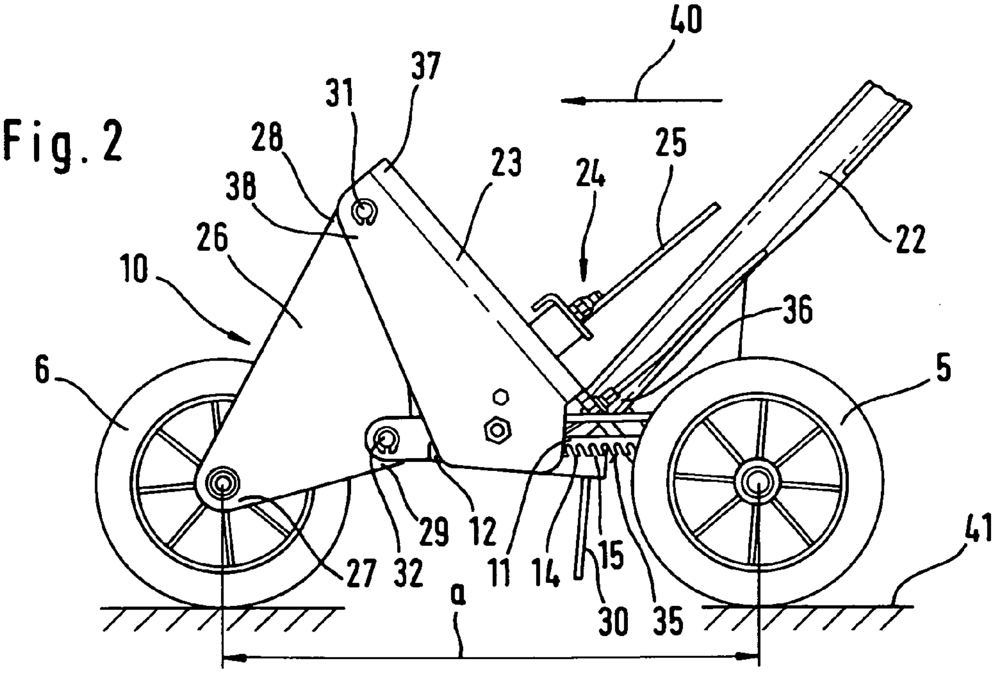
FIG. 2 shows a side view of the guide cart illustrated in FIG. 1 in a first operating position.

As illustrated in FIG. 2, the first strut 10 takes the from of a triangular plate 26. Mounted in a first corner 27 of the plate 26 in such a manner that it is able to rotate is the front wheel 6. A second corner 28 of the plate 26 is mounted on the end 37 of the frame section 23 facing away from the guide rod 22 with a bolt 31 in such a manner that it is able to rotate. In this arrangement, as illustrated in FIG. 1, the frame section 23 is designed as a U-shaped plate strut which is open towards the front wheel 6 and between the two legs 38 and 39 of which the plate 26 is mounted.

Mounted on the third corner 29 of the plate 26 with a bolt 32 in such a manner that it is able to rotate is the second strut 11. The second strut 11 is designed as a locking strip 14 having a plurality of notches 15. The notches 15 are designed such as to be open towards the longitudinal side 35 facing the ground 41. In FIG. 2 the locking strip 14 is fixed to a first mounting point 12 of the locking strip 14 on the frame 4. Fixed to the frame 4 in an area in front of the rear wheels 5 in the direction of travel 40 is a protective plate 30 which extends approximately perpendicular to the ground 41. With the method of fixing the second strut 11 to the first mounting point 12 illustrated in FIG. 2, the front wheel 6 is located a distance a from the two rear wheels 5 which corresponds to the minimum distance between the wheels 5 and 6. In order to fix the parting-off grinder 2 to the guide cart 1 a receiver 24 with a positioning rod 25 to facilitate the fitting of the parting-off grinder 2 onto the guide cart 1 is fixed to the frame 4. A parting-off grinder 2 positioned in the receiver 24 when the second strut 11 is mounted in the first mounting point 12 is located a distance from the ground 41 which ensures that the grinding wheel 9 of the parting-off grinder 2 does not come into contact with the ground 41 the parting-off grinder therefore being in a "parking" position.

Figure 3:
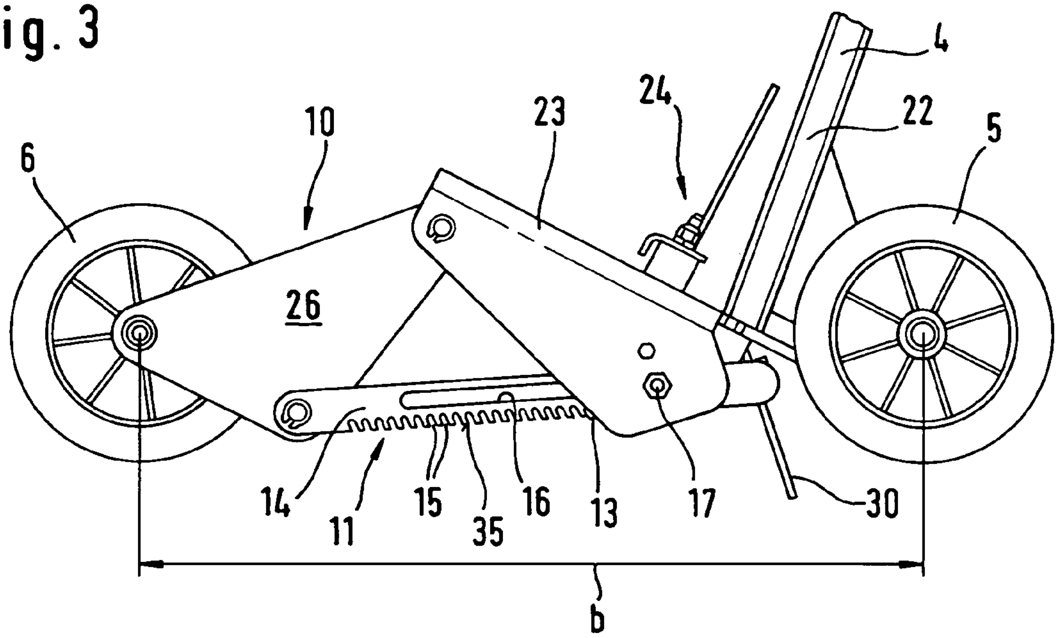
FIG. 3 shows a side view of the guide cart illustrated in FIG. 2 in a second operating position.

FIG. 3 shows the guide cart 1 in a position in which the second strut 11 is fixed to a second mounting point 13 on the frame 4 of the guide cart 1. In this position the wheels 5 and 6 are separated by a distance b which corresponds to the greatest possible distance between the wheels 5 and 6. The grinding wheel 9 of a parting-off grinder 2 positioned in the receiver 24 is in contact with the ground 41, the grinding wheel 9 producing a cut with the greatest possible cutting depth.

Figure 4:
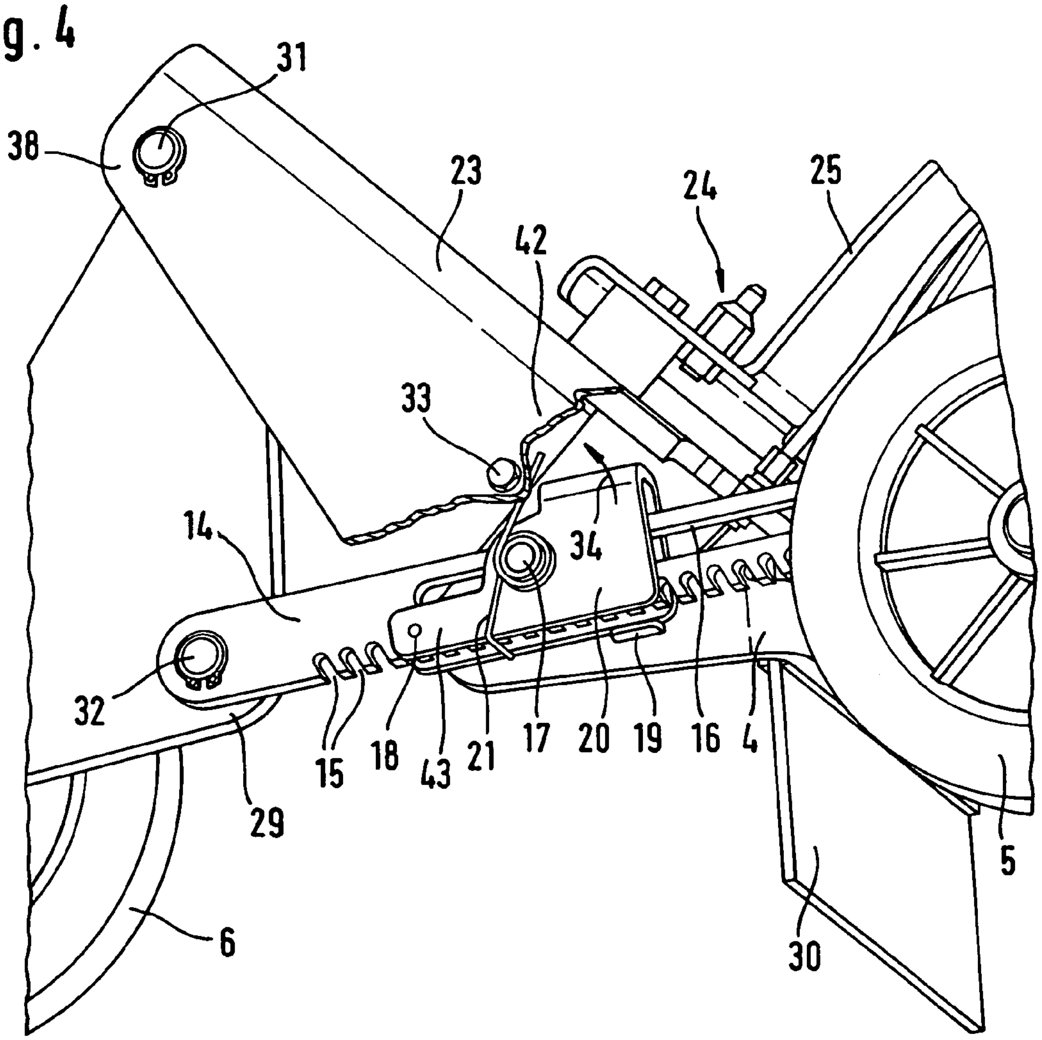
FIG. 4 shows a perspective view of the locking device of the guide cart.

FIG. 4 shows an enlarged view of the fixing of the second strut 11 to the frame 4. The second strut 11 which is designed as a locking strip 14 has a longitudinal notch or slot 16 in which the locking strip 14 is mounted to a bolt 17. The bolt 17 is mounted on the frame section 23 on the end 42 of the frame section 23 facing the rear wheels 5 as illustrated in the non-sectional view in FIG. 3. Mounted on the bolt 17 in such a manner that it is able to rotate is a guide 20 which has an essentially U-shaped cross-section, the U being open towards the ground 41. Starting at the bolt 17 the guide 20 has two arms 43 which extend on either side of the locking strip 14 in the direction of the front wheel 6. The arms 43 hold the locking element 18 which is designed as a bolt and projects into a notch 15 in the locking strip 14. Positioned on the bolt 17 is a torsion spring 21 which has one arm resting on a bolt 33 on the frame section 23 while the other arm presses the guide 20 towards the locked position of the locking element 18 i.e. in the opposite direction to the arrow 34 shown in FIG. 4. In this arrangement, the rotational movement of the guide 20 about the bolt 17 against the arrow 34 is limited by a stop 19 mounted on the frame 4

In order to adjust the mounting point at which the locking strip 14 is fixed to the locking element 18, the guide 20 is rotated by the operator about the bolt 17 in the direction of the arrow 34. In this arrangement the rotational movement is against the force of the spring (21). The rotational movement moves the locking element 18 out of a notch 15. As soon as the locking element 18 has left the notch 15 it is possible to move the locking strip 14 in the direction of the longitudinal notch (16 in which it is guided on the bolt 17. By releasing the guide 20, the latter is moved about the bolt 17, against the arrow 34 by the force of the spring 21 so that the locking element 18 engages with a notch 15 and the position of the locking strip 14 is locked.

Other locking mechanisms may also be useful. It may be useful to position the locking strip on the frame of the guide cart and for it to be possible for the strut to be mounted on the guide cart at several mounting points.

The invention claimed is:

1. A guide cart for an implement, comprising:

a frame comprising an upright section and a base section, essentially perpendicular from said upright section on which frame are disposed at least two wheels contacting a surface; and a first strut disposed on said base section of said frame on which is disposed at least one wheel contacting a surface, wherein said first strut is rotatably mounted on said base section of said frame; and a second strut, wherein for a mounting of said second strut on said frame at least two spaced-apart mounting points disposed on said second strut are provided, wherein said second strut is in the form of a locking strip having a plurality of notches at a longitudinal bottom side of said locking strip.

2. A guide cart according to claim 1, wherein said notches are open toward a longitudinal side of said locking strip.

3. A guide cart according to claim 1, wherein said notches cooperate with a locking element that is spring-loaded in a direction toward a locked position.

4. A guide cart according to claim 1, wherein said locking strip is mounted on a bolt that extends into a slot of said locking strip.

5. A guide cart according to claim 4, wherein said locking element is mounted on said frame so as to be rotatable about said bolt.

6. A guide cart according to claim 5, wherein said locking element is disposed on a guide that spans said locking strip and that is mounted on said bolt.

7. A guide cart according to claim 6, wherein a rotational movement of said locking element about said bolt is limited by a stop in a direction toward a locked position.

8. A guide cart according to claim 1, wherein said frame is provided with a guide rod on an end of which that faces said wheels is disposed a frame section that extends approximately at right angles to said guide rod, and wherein said first and second struts are mounted on said frame section.

9. A guide cart according to claim 1, wherein said second strut is rotatably mounted on said first strut.

10. A guide cart according to claim 9, wherein said first strut is formed by a plate, wherein one of said wheels is mounted in a first corner of said plate, wherein a second corner of said plate is rotatably mounted on said frame, and wherein said second strut is rotatably mounted in a third corner of said plate.

11. A guide cart according to claim 1, which includes a front wheel and two rear wheels, and wherein said front wheel is held by said first and second struts.

12. A guide cart for an implement, comprising:

a frame on which are disposed at least three wheels;

a first strut and a second strut for effecting mounting of at least one of said wheels on said frame, wherein said first strut is rotatably mounted on said frame, and wherein said second strut is rotatably mounted on said first strut, and wherein for a mounting of said second strut on said frame at least two spaced-apart mounting points are provided, and wherein said first strut is formed by a plate, wherein one of said wheels is mounted in a first corner of said plate, wherein a second corner of said plate is rotatably mounted on said frame, and wherein said second strut is rotatably mounted in a third corner of said plate.

13. A guide cart for an implement, comprising:

a frame on which are disposed at least three wheels;

a first strut disposed on said base section of said frame on which is disposed at least one wheel contacting a surface, wherein said first strut is rotatably mounted on said base section of said frame; and a second strut, wherein for a mounting of said second strut on said frame at least two spaced-apart mounting points disposed on said second strut are provided, wherein said second strut is in the form of a locking strip having a plurality of notches at a longitudinal bottom side of said locking strip, and wherein said locking strip is mounted on a bolt that extends into a slot of said locking strip.

* * * * *